No. 733,467. PATENTED JULY 14, 1903.
H. H. DOW.
PROCESS OF MANUFACTURING BROMIDS FROM BROMIN CONTAINING SOLUTIONS.
APPLICATION FILED MAY 21, 1903.
NO MODEL.
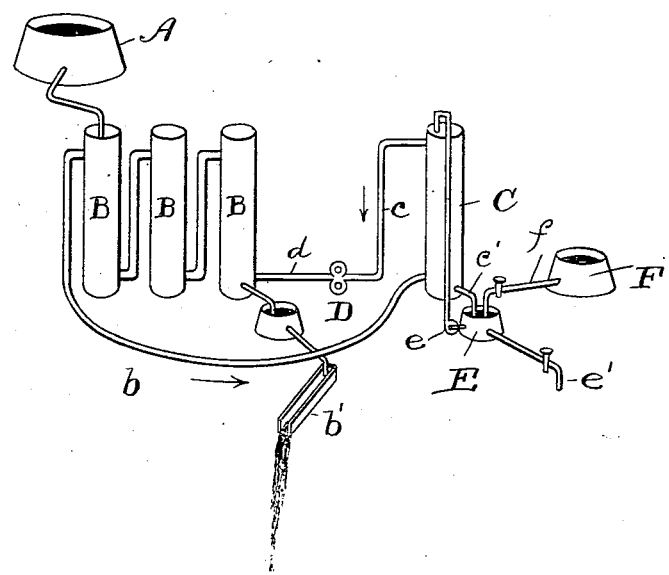
Witnesses.
E. B. Gilchrist
G. W. Saywell
Inventor.
Herbert H. Dow
by J. B. Fay
Atty.

No. 733,467. Patented July 14, 1903.

UNITED STATES PATENT OFFICE.

HERBERT H. DOW, OF MIDLAND, MICHIGAN.

PROCESS OF MANUFACTURING BROMIDS FROM BROMIN-CONTAINING SOLUTIONS.

SPECIFICATION forming part of Letters Patent No. 733,467, dated July 14, 1903.

Application filed May 21, 1903. Serial No. 158,079. (No specimens.)

*To all whom it may concern:*

Be it known that I, HERBERT H. DOW, a citizen of the United States, and a resident of Midland, county of Midland, and State of Michigan, have invented a new and useful Improvement in Processes of Manufacturing Bromids from Bromin-Containing Solutions, of which the following is a specification, the principle of the invention being herein explained and the best mode in which I have contemplated applying that principle, so as to distinguish it from other inventions.

My invention consists in an improved process for manufacturing bromids from bromin-containing solutions, such as natural brines or artificial solutions of a bromid, and is especially adapted for the manufacture of ammonium bromid.

Said process consists of a series of steps hereinafter fully described.

The annexed drawing and the following description set forth in detail one mode of carrying out the invention, such disclosed means constituting but one of various ways in which the principle of the invention may be used.

In said annexed drawing is represented a diagrammatic view of a form of apparatus used in my improved process.

In said apparatus A represents a brine-reservoir in which the brine may be oxidized in any of the ways explained in my United States Letters Patent, Reissue No. 11,232, with the formation of free bromin.

B represents a series of blow-out towers similar to those described in my United States Letters Patent No. 714,160. C represents an absorption-tower of similar construction, and D represents a rotary exhauster or similar device for keeping the air in circulation.

It will be seen that the towers B, the air-pipe $b$, the tower C, the air-pipe $c$, the blower D, and the air-pipe $d$ constitute an air-circuit similar to that described in above-mentioned Reissue Patent No. 11,232. No claim for novelty is therefore made to this part of the apparatus.

Connected with the absorption-tower C by the duct $c'$ and adapted to receive material from such absorption-tower is the containing vessel E, and connected with said containing vessel by the duct $f$, also adapted to discharge material into said containing vessel E, is the containing vessel F. Material may be pumped from the container E to the absorption-tower C by means of the pump $e$. Outlets are provided for the waste brine or liquor from the towers B and for bromid from the container E through the ducts $b'$ and $e'$, respectively.

If the absorption-tower C contained a fixed alkali and the apparatus could be used as explained in above-mentioned patent, Reissue No. 11,232, a bromid would result. If, however, the tower C was supplied with ammonium hydrate and the process was carried on as explained in said patent, some ammonia would be blown out and would pass along the pipe $c$ through the blower D and connecting-pipe $d$ and would come into contact with the bromin contained in the brine in the towers B. This ammonia would here neutralize some of the bromin contained in the brine according to the following formula:

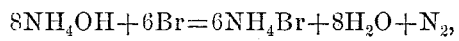
$$8NH_4OH + 6Br = 6NH_4Br + 8H_2O + N_2,$$

and thus only a part of the bromin would be carried over by the air into the tower C, another part being neutralized with the formation of ammonium bromid, as explained, and passing out with the brine waste at $b'$. This process is therefore not an economical method of making ammonium bromid, as both ammonia and bromin are wasted.

Bromin is very much more soluble in a bromid than it is in a chlorid, and, as explained in my United States Letters Patent No. 714,160, a natural brine is constituted mainly of a solution of various chlorids. Now if the tower C is supplied with a solution of ammonium bromid and the blower D is started and the air is caused to circulate, as indicated by the arrows, the bromin-laden air will come in contact with the ammonium bromid in the tower C, and the bromin will be absorbed with the production of a liquid of more or less orange color, this color being due to the presence of free bromin, as may be readily shown by testing a little of the liquid with chloroform or carbon disulfid, in either of which cases the bromin will be taken up by the added solvent and the ammonium-bromid solution rendered colorless. This bromin solution of ammonium bromid is allowed to pass out of the tower C into the containing vessel E. Here the free bromin is neutralized by a small amount of ammonia solution admitted from the containing vessel F, and ammonium bromid is formed according to the formula above given. This solution is again pumped over into the tower C by means of the pump e and comes in contact with more bromin-laden air, is again charged with bromin, and the cycle repeated. It is thus seen that ammonium bromid may be made from bromin-laden air without undue loss of either ammonia or bromin.

It will be apparent to any one versed in the subject of chemistry and acquainted with my United States Letters Patent No. 714,160 that the methods there outlined for purifying the bromin contained in bromin-laden air could also be applied to the process herein disclosed. It will also be evident that the brine escaping at b' can be reworked for recovering the free and combined bromin therein contained, as explained in said patent. It will also be apparent that in order to operate the apparatus in the most successful manner the bromin-laden air should be as rich in bromin as possible, and to produce this result only a limited amount of air should be passed through the brine. Under these circumstances the waste at b' will always contain a considerable quantity of free bromin. This waste should therefore be used in a supplemental or additional apparatus for the recovery of this material; but as such apparatus is fully described and explained in Patent No. 714,160, above referred to, it is not necessary to again describe the process.

The production of air containing a very large amount of bromin of a high degree of purity can be accomplished by using an artificial bromin solution for charging the air; but we do not consider this necessary or desirable except when a product having maximum purity is desired.

While I particularly recommend this process for the manufacture of bromid of ammonia, yet it is evident that any bromid can be formed in the same manner.

Wherever the word "pure" is used in the following claims it should be understood as meaning an article of sufficient purity to be a commercial product.

Other modes of applying the principle of my invention may be employed instead of the one explained, change being made as regards the step or steps herein disclosed, provided the means stated by any one of the following claims or the equivalent of such stated means be employed.

I therefore particularly point out and distinctly claim as my invention—

1. The steps in the process of manufacturing a bromid from bromin-containing solutions which consist, in bringing air, first into contact with a solution containing free bromin, and then into contact with a pure bromid.

2. The steps in the process of manufacturing a bromid from bromin-containing solutions which consist, in bringing air, first into contact with a solution containing free bromin, and then into contact with pure ammonium bromid.

3. The steps in the process of manufacturing a bromid from bromin-containing solutions which consist, in bringing air, first into contact with sodium-chlorid solution containing free bromin, and then into contact with pure ammonium bromid.

4. The steps in the process of manufacturing a bromid from bromin-containing solutions which consist, in absorbing bromin from bromin-laden air by means of a pure bromid, and then subsequently taking up the bromin thus absorbed by a suitable material that will combine chemically with bromin.

5. The steps in the process of manufacturing a bromid from bromin-containing solutions which consist, in absorbing bromin from bromin-laden air by means of pure ammonium bromid, and then subsequently taking up the bromin thus absorbed with ammonia.

6. The steps in the process of manufacturing a bromid from bromin-containing solutions which consist, in absorbing bromin from bromin-laden air by means of pure ammonium bromid, subsequently taking up the bromin thus absorbed by a suitable ammonia-containing material, and then using the bromid so formed as a solvent for absorbing additional quantities of bromin from bromin-laden air.

7. The steps in the process of manufacturing a bromid from bromin-containing solutions which consist, in absorbing bromin from bromin-laden air by means of pure ammonium bromid, subsequently taking up the bromin thus absorbed with ammonia, and then using the ammonium bromid so formed as a solvent for absorbing additional quantities of bromin from bromin-laden air.

8. The steps in the process of manufacturing a bromid from bromin-containing solutions which consist, in oxidizing the solution, blowing out the bromin thus set free, absorbing the bromin by means of a pure bromid, and then taking up the bromin thus absorbed by a suitable material that will combine chemically with bromin.

9. The steps in the process of manufacturing a bromid from bromin-containing solutions which consist, in oxidizing the solution, blowing out the bromin thus set free, absorbing the bromin by means of a pure bromid, taking up the bromin thus absorbed by a suitable material that will combine chemically with bromin, and then using the bromid so formed as a solvent for absorbing additional quantities of bromin from bromin-laden air.

10. The steps in the process of manufacturing a bromid from bromin-containing solutions which consist, in oxidizing the solution, blowing out the bromin thus set free, absorbing the bromin by means of pure ammonium bromid, taking up the bromin thus absorbed with ammonia, and then using the ammonium bromid so formed as a solvent for absorbing additional quantities of bromin from bromin-laden air.

11. The steps in the process of manufacturing a bromid from bromin-containing solutions which consist, in oxidizing the solution, then blowing out, purifying, and absorbing the bromin in a suitable ammonia-containing material.

Signed by me this 19th day of May, 1903.

HERBERT H. DOW.

Attest:
   D. T. DAVIES,
   G. W. SAYWELL.